July 23, 1968 R. E. PACKARD 3,394,350
DIGITAL PROCESSOR IMPLEMENTATION OF TRANSFER AND TRANSLATE OPERATION
Filed Jan. 14, 1965 2 Sheets-Sheet 1

PARTIAL TRANSLATION TABLE

| OPERAND TO BE TRANSLATED | TRANSLATED OPERAND |
|---|---|
| 100110 | 110101 |
| 101001 | 111000 |

PARTIAL TRANSLATION TABLE

| OPERAND TO BE TRANSLATED | TRANSLATED OPERAND |
|---|---|
| 100110 | 001111 |

INVENTOR
ROGER E. PACKARD
BY
Christie, Parker & Hale
ATTORNEYS.

INVENTOR
ROGER E. PACKARD
BY
Christie, Parker & Hale
ATTORNEYS.

United States Patent Office 3,394,350
Patented July 23, 1968

3,394,350

DIGITAL PROCESSOR IMPLEMENTATION OF TRANSFER AND TRANSLATE OPERATION

Roger E. Packard, Glendora, Calif., assignor to Burroughs Corporation, Detroit, Mich., a corporation of Michigan Filed Jan. 14, 1965, Ser. No. 425,465
14 Claims. (Cl. 340—172.5)

ABSTRACT OF THE DISCLOSURE

Apparatus for transferring and translating digital information from one code to another in response to a single machine instruction. Translation tables are stored within the memory of a data processor such that the memory address locations of each table correspond to particular operands of a code to be translated and information values stored at these addresses correspond to respective operands of the translated code. Associated circuitry is provided which sequentially removes a predetermined number of information values from predetermined first address locations, translates them into another code by means of a predetermined one of the tables, and stores them in predetermined second address locations, all in response to a single instruction.

This invention relates to digital data processors and more particularly to the implementation within such processors of an improved data translation and transfer means.

The necessity of translation arises primarily when the output of one data processor is used as the input to a second data processor. Since such processors ordinarily utilize different codes, the output of the first processor must be translated prior to its introduction into the second processor. In the past such translations have generally been accomplished by means of diode translators. Such translators, however, have the disadvantage of being inflexible since they are limited to translations from a first particular code to a second particular code. Thus, an increase in the number of different translations from a particular code, or an increase in the number of codes to be translated, necessitates corresponding increases in the necessary number of such translators.

Translations may also be achieved by means of programming methods. Programming methods, however, are much slower than the use of translators.

The present invention represents an improved means for achieving such translations which is much faster than programming methods and much more flexible than the use of translators. Additionally, it is less expensive than would be flexibility achieved by means of a large number of such translators.

The preceding and other advantages of the present invention are achieved by means of a translation table stored within the memory element of the digital data processor itself and the operation of cooperating circuitry to effectuate the removal of an information character stored in one part of the memory, translation of that character into a corresponding translated character in accordance with the table stored in memory, and storage of the translated character in another part of the memory.

The translation is controlled by means of a particular instruction or command which constitutes one of the instructions programmed into the data processor. This particular instruction may conveniently be designated the "Transfer and Translate Command." Briefly, this command indicates to the processor the nature of the command to be performed (i.e., transfer and translate), the address within the memory of the character to be translated, and the address within the memory where the corresponding translated character is to be stored. Moreover, this command controls the operation of the cooperating circuitry which effectuates the transfer and translate operation. Additionally, it may indicate which of several translation tablets is to be used and how many successive addresses should have their contents translated and stored in a corresponding group of other addresses.

A command address register addresses the memory to fetch from the memory commands which are stored in particular addresses of the memory. The sequence of commands fetched by the command address register is determined by instructions programmed into the memory. The present invention is concerned only with the implementation of the particular command designated the "transfer and translate command." The transfer and translate command will indicate: first, that the processor is to carry out the transfer and translate operation and which of several translation tables stored in memory is to be used; second, the number of consecutive addresses whose contents are to be transferred and translated; third, the first address of the group of addresses whose contents are to be translated; and fourth, the first address of the group of addresses into which the translated information is to be stored.

In addressing an address in memory in which the command to be performed is stored, the command address register first reads out the operation code portion of the command. The operation code, which as stated previously indicates the particular command to be carried out, is initially stored in a first information register and subsequently transferred to an operation register. The command address register next reads out information concening the number of addresses whose contents are to be translated. This information is initially stored in the first information register and subsequently transferred to a character count register. The command address register next reads out the first address of the group of addresses whose contents are to be transferred and translated. This information is initially stored in the first information register and subsequently transferred to an "address of operand" register. Finally, the command address register reads out the first address of the group of addresses in which the translated information is to be stored. This information is initially stored in the first information register and subsequently transferred to an "address of translated operand" register. At this point, the command address register has read the entire command out of the memory and all of the information contained in the command is stored in the various registers as just described.

The "address of operand" register now reads out of the memory a particular operand to be translated. This information is initially stored in the first information register and subsequently transferred to an "operand" register. The "operand" register now reads out of the memory the translated operand stored in the memory at the address corresponding to the character stored in the "operand" register. The translated operand is stored in the first information register which may now be designated the "translated operand" register. Next, the "address of translated operand" register is utilized to write the translated operand store in the "translated operand" register into the memory. It is written into the address stored in the "address of translated operand" register.

During the sequence of operations recited in the preceding paragraph, counting circuitry is utilized to increase by one digit the address stored in the "address of operand" register and the address stored in the "address of translated operand" register. At the same time, counting circuitry is utilized to decrease by one digit the number of addresses whose contents are to be translated, which is stored in the character count register. The operations recited in the preceding paragraph are then repeated utilizing the new addresses stored in the "address of operand" register and the "address of translated operand" register. During this operation the counting circuitry again operates to increase by one digit the addresses stored in these registers and to decrease by one digit the contents of the character count register. This cycle continues until the character count register reads zero. A zero reading of the character count register indicates that the transfer and translate command has been carried out to completion and the command address register may proceed to read the next command programmed into the data processor.

Implementation of a transfer and translate command in accordance with the foregoing general description has been designed for the B200 digital data processor of the Burroughs Corporation. This data processor has been described in Patent No. 3,274,558 of R. S. Sharp et al., entitled, Digital Data Processor, which issued on Sept. 20, 1966, and is assigned to the Burroughs Corporation. All of the registers and other circuitry utilized in the present invention are old in the art. The present invention lies in a novel combination of this circuitry and in a unique cooperative effort whereby they carry out the trasfer and translate command. Such prior art circuitry is shown in detail in the patent application previously referred to and in any standard reference work on digital data processing such as, for example, Digital Computer Fundamentals, by Thomas C. Bartee, published by McGraw-Hill Book Co., Inc., in 1960, both of which may be considered incorporated herein by reference.

In the detailed description of the present invention which follows, an embodiment of the invention substantially in accordance with the embodiment designed for use in the aforementioned Burroughs digital data processor is described. This of course represents only one illustrative embodiment of the present invention and various and numerous other arrangements may be devised by one skilled in the art without departing from the spirit and scope of this invention. For illustrative purposes the circuitry used in the described embodiment is shown generally in block diagram form in the accompanying drawing. The function of each element of this circuitry will be made clear by the following detailed description. The structure and manner of operation of these circuit elements is well known and may be found, for example, in the copending application and the text previously cited.

In the following detailed description, the manner of operation of the present invention and the manner in which it achieves the advantages previously referred to and additional advantages over the prior art may be more clearly understood by reference to the accompanying drawing in which.

Figures 1, 3, 4:
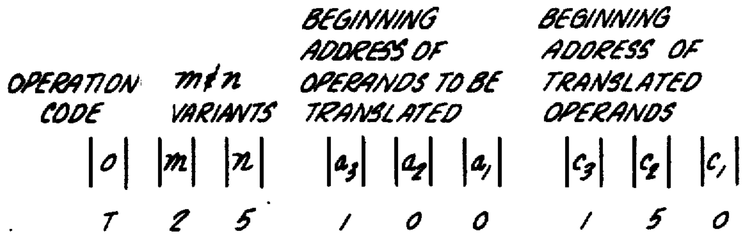
FIG. 1 depicts an illustrative command word directing the data processor to perform a particular transfer and translate command.
FIG. 3 depicts part of an exemplary translation table to be used in conjunction with the present invention.
FIG. 4 depicts part of a second exemplary translation table to be used in conjunction with the present invention.

FIG. 1 depicts a typical command word which may be used in conjunction with the present invention. It consists of nine characters with each character comprising six binary digits. The first character denotes the particular command to be followed and is called the operation code character. Thus, the transfer and translate command will be designated by a particular combination of digits making up the operation code character of the command word. The next two characters are called the "$m$" and "$n$" variants, respectively. In the operation of the transfer and translate command these variants designate the number of addresses whose contents are to be translated. The next three characters designated "$a_3$," "$a_2$," and "$a_1$" determine the beginning address of the operands to be translated. The next three characters designated "$c_3$," "$c_2$," and "$c_1$" determine the beginning address of the translated operands.

Beneath the command word shown in FIG. 1, an exemplary particular transfer and translate command is shown. In this command the operation code character is shown to contain a "$t$" which represents the transfer and translate command. The "$m$" and "$n$" variants are shown to contain the numerals 2 and 5, respectively, representing that 25 addresses are to be utilized in the transfer and translate operation. The "$a_3$," "$a_2$," and "$a_1$" characters contain the numerals 1, 0, and 0, respectively, indicating that the address of the first operand to be translated is address 100. The characters "$c_3$," "$c_2$," and "$c_1$" contain the numerals 1, 5 and 0, respectively, indicating that the beginning address of the translated operands is to be address 150. Although the "$m$" and "$n$" variants have been set to represent the number 25, since each character has six bits it is obvious that many more than 25 addresses could be represented by the "$m$" and "$n$" variants.

Figure 2:
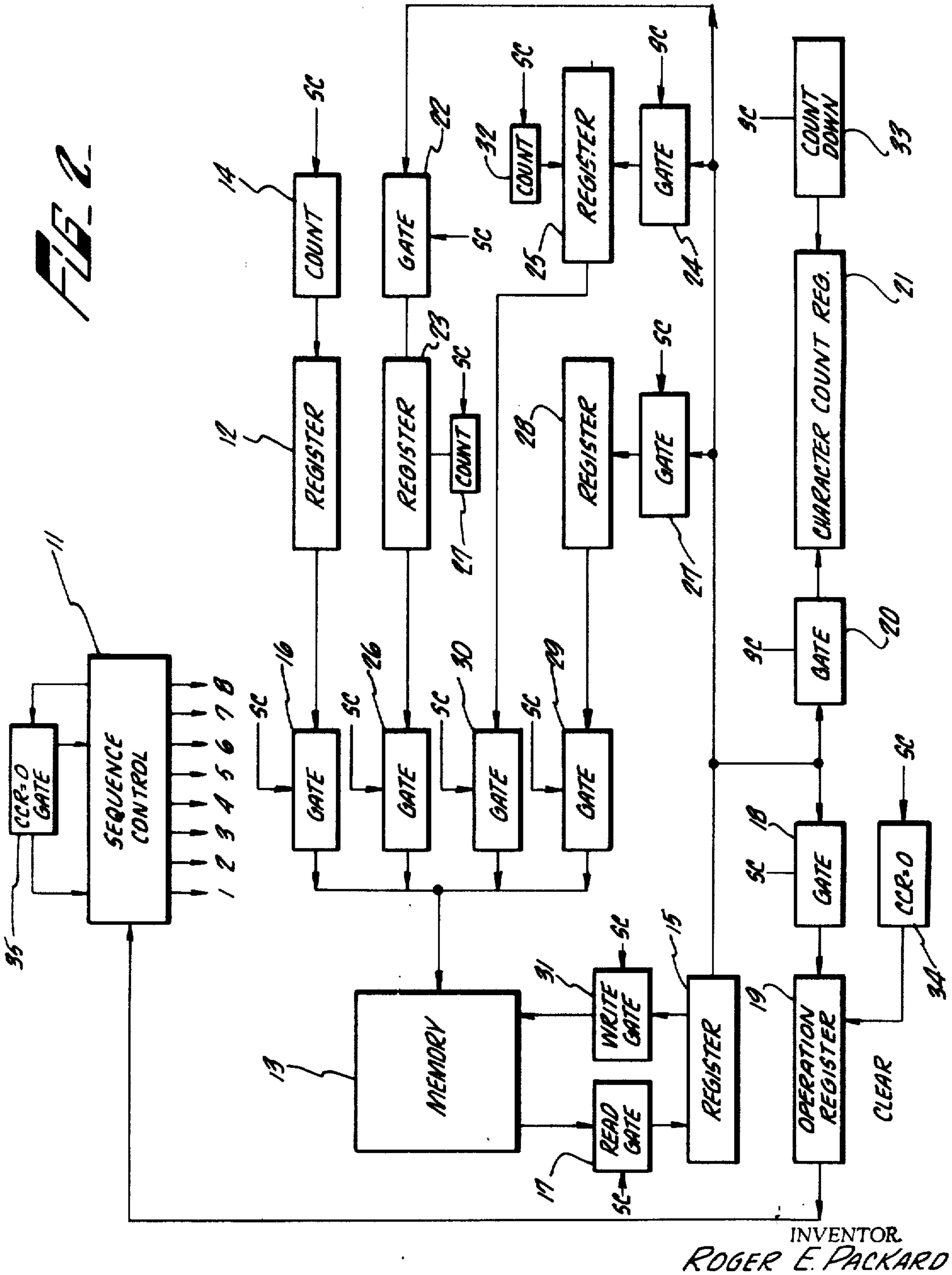
FIG. 2 depicts, primarily in block diagram form, a basic form of the present invention.

FIG. 2 depicts a basic form of the present invention. Combinational gating network sequence control 11 provides pulses used in operating the various elements of the transfer and translate command during successive sequences of operation. There are 8 sequences or phases of operation in carrying out the transfer and translate command as shown in FIG. 2. Combinational gating network sequence control 11 provides various combinations of pulses to the other elements shown in FIG. 2 during the successive phases of operation. These combinations of signals are depicted in FIG. 2 by the arrows 1 through 8 emanating from sequence control 11.

During the operation of the data processor utilizing the transfer and translate command circuitry of FIG. 2, command address register 12 reads commands out of memory 13 and stores them in information registers. This operation is sometimes referred to as the "fetching" of a command. Counting circuitry 14 changes the command address stored in command address register 12, as commands stored in memory 13 are sequentially carried out by the data processor. Command address register 12 fetches one character at a time of the command word from the memory 13. After each character of the command word has been fetched the counting circuitry 14 increases the address stored in command address register 12, thereby causing register 12 to fetch the next character of the command during the succeeding phase of operation. Thus, under the influence of counting circuitry 14, the command address register 12 fetches each character of a command word, one character at a time, from memory 13 and stores that character of the command word temporarily into information register 15. Gate 16 and read gate 17 are also operated during these phases of operation.

The entire command word is read from memory 13 in several steps. The first portion of the command word to be read from memory 13 is the operation code. The operation code is read from memory 13 in what will be considered the first phase of operation of the transfer and translate command. During this first phase of operation, sequence control 11 provides those pulses designated by arrow 1. At this time pulses are provided to gate 16 and read gate 17 to read the operation code character of the command word from the memory and to store it temporarily in information register 15. Also during the first phase of operation counting circuitry 14 increases the address stored in command address register 12.

During the second phase of operation, sequence control 11 provides those pulses to the rest of the circuitry which are designated by arrow 2. At this time pulses are applied again to gate 16 and gate 17 and also to gate 18 located between operation register 19 and information register 15. At this time the operation code character previously stored in register 15 is transferred to the operation register 19 and the "$n$" variant character is transferred from memory 13 to register 15. It may be advisable to point out that whenever information is read from memory 13 and stored in register 15 during a phase of operation, that information will appear in register 15 a finite period of time after the memory has been addressed. This information will appear in information register 15 prior to the succeeding phase of operation, however. Counting circuitry 14 is also activated during the second phase of operation to increase the address stored in command address register 12.

Next, a second part of the second phase of operation repeats the operations just described in order to fetch the "$m$" variant character. Gate 16 and gate 17 are again activated as is gate 20 located between information register 15 and character count register 21. At this time the "$n$" variant previously stored in information register 15 is transferred to character count register 21 and the "$m$" variant is read out from memory 13 and stored temporarily in information register 15. At the conclusion of the second phase of operation both the "$m$" and "$n$" variants have been fetched from memory.

It is apparent that the two parts of the second phase of operation are not identical. During the first part gate 18 is activated and gate 20 is not, while during the second part gate 20 is activated and gate 18 is not. The first two phases of operation are as just described regardless of the particular command fetched from the memory of the data processor of which the circuitry of FIG. 2 is a part. Subsequent to the first two phases of operation, the operation code character is stored in register 19. Succeeding phases of operation are dependent upon the particular operation code character stored in operation register 19. Connections between operation register 19 and sequence control 11 control the particular combinations of pulses to be provided by sequence control 11 during the remaining phases of operation for the transfer and translate operation. These remaining pulses are designated by the arrows 3 through 8 shown in sequence control 11. Sequence control 11 thus decodes the particular character stored in operation register 19 and applies the proper combination of pulses during the remaining sequences of operation. A combinational gating network sequence control such as 11 is old in the art and therefore is shown in FIG. 2 simply in block diagram form.

In the data processor previously referred to for which circuitry, in substantial accordance with that shown in FIG. 2, implementing a transfer and translate operation has been designed, the "$n$" variant of the command is fetched prior to the "$m$" variant. Which of these characters is fetched first is however not material insofar as the present invention is concerned. Similarly, in subsequently fetching the "$a$" characters, as shown in FIG. 1, the "$a_1$" character is fetched first, followed by the "$a_2$" character and then the "$a_3$" character and in subsequently fetching the "$c$" characters, as shown in FIG. 1, the "$c_1$" character is fetched first, followed by the "$c_2$" character and then the "$c_3$" character. The order of selection of the "$a$" characters and of the "$c$" characters is also immaterial insofar as the present invention is concerned. If it be assumed that the "$n$" variant was read out prior to the "$m$" variant in the second phase of operation, and that the exemplary word shown in FIG. 1 is the command word being utilized, then the operation code representing "transfer and translate" is at this time stored in register 19, a character representing the digit "5" is stored in register 21 and a character representing the digit "2" is stored in register 15.

During the third phase of operation the characters representing the beginning address of the operands to be translated are fetched from memory. These characters are represented in FIG. 1 by "$a_3$," "$a_2$," and "$a_1$." This phase of operation is carried out in three parts with the three characters "$a_3$," "$a_2$," and "$a_1$" being brought out separately. During the first part of this phase of operation, sequence control 11 applies signals to gate 16, read gate 17, and gate 20. At this time, character "$a_1$" is fetched from memory 13 and stored in information register 15 while the "$m$" variant character is transferred from information register 15 to character count register 21. Both the "$m$" and "$n$" variants "2" and "5" are now stored in character count register 21, while the character "$a_1$" representing decimal digit "0" is stored in information register 15. At this time counting circuitry 14 again advances the address stored in command address register 12.

During the second part of the third phase of operation, sequence control 11 applies signals to gate 16, read gate 17 and gate 22 between information register 15 and information register 23. At this time character "$a_1$" is transferred from register 15 to register 23, and character "$a_2$" is fetched from memory and stored in register 15. Counting circuitry 14 then again advances the address stored in command address register 12.

During the third part of the third phase of operation, sequence control 11 applies signals to gate 16, read gate 17 and gate 22. At this time character "$a_2$" is transferred from register 15 to register 23 and character "$a_3$" is fetched from memory 13 and stored in register 15. Counting circuitry 14 again advances the address stored in command address register 12. Characters "$a_1$," and "$a_2$" both representing decimal "0's" in the exemplary command word shown in FIG. 1 and character "$a_3$" representing a decimal "1" have now been fetched from memory 13. The two "0's" are stored in register 23, while the "1" is at this time still stored in register 15.

During the fourth phase of operation the characters representing the beginning address of the translated operands are fetched from memory 13. During the first part of this phase of operation, sequence control 11 applies signals to gate 16, read gate 17, and gate 22. At this time, character "$c_1$" is fetched from memory 13 and stored in register 15 while the character "$a_3$" is transferred from register 15 to register 23. Counting circuitry 14 again advances the address stored in command address register 12.

During the next part of this phase of operation, sequence control 11 applies signals to gate 16, read gate 17, and gate 24, located between register 15 and information register 25. At this time, character "$c_1$" is transferred from register 15 to register 25 and character "$c_2$" is stored in register 15. Counting circuitry 14 then again advances the address stored in command address register 12.

During the third part of the fourth phase of operation sequence control 11 again applies pulses to gate 16, read gate 17 and gate 24. At this time character "$c_2$" is transferred from register 15 to register 25 and character "$c_3$" is fetched from memory 13 and stored temporarily in register 15. With reference again to the exemplary command word shown in FIG. 1, it may be seen that the digits "5" and "0" are at this time stored in register 25 while the digit "1" is stored in information register 15. Counting circuitry 14 again advances the address stored in command address register 12.

During the fifth phase of operation, the transfer of the "$c$" characters to register 25 is completed. Sequence control 11 applies a signal to gate 24 which effectuates the transfer of character "$c_3$" from register 15 to register 25.

At this time, the operation code portion of the command word is stored in operation register 19, the "$m$" and "$n$" variants are stored in character count register 21, the "$a$" characters are stored in "address of operand" register 23, and the "$c$" characters are stored in "address of translated operand" register 25. With reference again to the exemplary command word shown in FIG. 1, the operation register stores the command designating that the transfer and translate operation is to be carried out, the character count register stores the number "25," the "address of operand" register stores the number "100," and the "address of translated operand" register 25 stores the number "150." At this time, the entire transfer and translate command has been transferred from the memory into the above mentioned registers. The subsequent phases of operation carry out the actual transfer and translate operation.

During the sixth phase of operation, the operand to be translated is read out of memory 13. During this phase of operation, sequence control 11 applies signals to activate gate 26 and read gate 17. Since register 23 is storing the address 100, the information stored in this particular address is read out of memory 13 and stored in register 15.

FIG. 3 depicts a portion of a translation table stored in memory 13. For purposes of illustration, assume that the operand just read out of memory 13 and stored in register 15 is the six bit binary character "100110" which also appears in the portion of the translation table shown in FIG. 3. Counting circuitry 27 at this time is activated by sequence control 11 to increase by one the address stored in memory address register 23. Thus, at the end of the sixth phase of operation, the address stored in register 23 is "101" rather than "100."

During the seventh phase of operation, the operand to be translated which is presently stored in register 15 is translated and the translated operand is in turn also stored in register 15. This phase of operation takes place in two parts. Sequence control 11 first applies a signal to activate gate 27. At this time the operand to be translated is transferred from register 15 to register 28. Subsequently, sequence control 11 also activates gates 17 and 29. At this time register 28 addresses memory 13 and read out of memory 13 the translated operand which in turn is stored in register 15. During this seventh phase of operation, a translation table stored in memory 13 has been addressed. As described previously, each address of this table corresponds to an operand to be translated and the translated operands are stored in the corresponding addresses. Thus, at the end of the seventh phase of operation the translated operand is stored in information register 15.

With reference again to FIG. 3, if the operand to be translated is represented by the binary digits "100110" and the corresponding translated operand is represented by the binary digits "110101," then the digits "100110" stored in information register 28 were used to address the translation table of the memory and the translated digits "110101" representing the translated operand are now stored in register 15. With operands represented by characters of six binary digits, the translation table stored in memory 13 may comprise sixty four addresses and be utilized to translate sixty four different operands.

During the eighth phase of operation, the translated operand is stored in the memory 13 at the address stored in register 25 and the transfer and translate operation is completed for the first operand to be translated. During this phase of operation, sequence control 11 applies signals to gate 30 and write gate 31. At this time the translated operand represented by the digits "110101" is stored in memory 13 at address "150." Counting circuitry 32 is activated by sequence control 11 at this time to increase by one the address stored in register 25. The register 25 will now store address "151" rather than "150." At this time also, a signal is applied to counting circuitry 33 and the character count stored in register 21 is decreased by one. Thus, at this time character count register 21 will store the count "24" rather than the count "25," indicating that 24 more characters are to be translated. A signal is also applied to clearing circuitry 34 which, when the character count register 21 registers "0," operates to clear operation register 19. However, since character count register 19 contains the number "24," no such clearing operation takes place. Additionally, a signal is applied to gate 35. Since character count register 21 does not read "0" at this time, gate 35 returns sequence control 11 to the sixth phase of operation. If, however, character count register 21 had read "0," the gate 35 would return sequence control 11 to the first phase of operation.

At this time, the sixth, seventh, and eighth phases of operation are repeated for the second operand to be translated. Register 23 contains the number "101" which corresponds to the second address of the operands to be translated. Register 25 contains the number "151" which corresponds to the second address of the translated operands. The sixth, seventh and eighth phases of operation are repeated to carry out the transfer and translation of the second character to be translated. With reference to FIG. 3, assume that address 101 contains an operand represented by the binary digits "101001." These digits will first be stored in register 15 and then removed to register 28. Utilizing the table of FIG. 3, the translated operand corresponding to the operand to be translated is represented by the digits "111000." Register 28 addresses the translation table stored in memory 13 and the translated digits "111000" are stored in register 15 and subsequently stored in address "151."

At the end of this translation, the "address of operand" register 26 will have "102" stored therein, the "address of translated operand" register 25 will have "152" stored therein, and the character count register 21 will have "23" stored therein. Gate 35 will again return sequence control 11 to phase six of the sequences of operation and the third character will be transferred and translated. The transfer and translate operation continues as described previously until the character count register 21 is counted down to "0" at the end of the transfer and translation of the 25th operand. At this time clearing circuitry 34 is activated to clear operation register 19 and gate 35 is activated to return combinational gating network sequence control 11 to phase one of operation. The completion of the full transfer and translate command has now been achieved. Command address register 12 and gates 16 and 17 are again activated during a following first phase of operation, the next command programmed into the processor is begun to be read out of memory 13, and the processor continues its operations. As stated previously, the embodiment described is substantially in accordance with an embodiment designed for use in a digital data processor described in the copending application referred to above. In that processor, command words having twelve characters with each character comprising six binary digits are used. Since the transfer and translate command circuitry just described utilizes only nine characters, it may utilize nine of the twelve available characters when designed into a processor using 12 character commands.

As described in the discussed embodiment, each character of the command word was read out one character at a time. Thus, the information register 15 need only be large enough to contain one character. Similarly, the operation register 19 need only be of a size to contain one character, namely the operation code. The character count register 21 is of a size to contain two characters, namely the "*m*" and "*n*" variant characters. The command address register 12 is of a size to contain three characters. These three characters define both the particular command being read out and also the particular character within the command being read out. Thus, as the counting circuitry 14 increases the information stored in address register 12 during the process of operation, the command address register will subsequently read out the next character of the command being read out. The register 23 and register 25 are also of a size to contain three characters. These characters define, respectively, the particular address of the operand to be translated and the particular address where the translated operand is to be stored. Additionally, the information register 28 is of a size to contain but one character. As will be recalled, it contains the character to be translated and addresses the table stored in memory 13, specifically the address corresponding to the operand to be translated. Since an address is defined by three characters and register 23 contains but one, gate 29 must always address one of the addresses of the table, with the particular one being determined by the character stored in information register 28. Since each character contains six binary digits, any one of 64 table addresses may be addressed by means of gate 29 and information register 28.

The registers 12, 15, 19, 21, 23, 25, and 28 represent circuitry well-known in the prior art and are therefore here represented in block diagram form. Similarly, the counting circuitry 14, 27, 32 and 33 represent circuitry well-known in the prior art and are also shown in block diagram form. Such circuitry operates either to increase or decrease the information stored in its corresponding register in response to a signal applied from the sequence control circuitry 11. Such signals are indicated by the arrows drawn toward these circuits with the letters SC adjacent the arrows.

Gates 16, 17, 18, 19, 20, 22, 24, 26, 27, 29, and 30 are also circuits well-known in the prior art and these too are shown here in block diagram form. These circuits simply act to transmit information in response to signals received from sequence control 11. The signals received from combinational gating network sequence control 11 are indicated by the arrows drawn thereto and the letters SC adjacent the arrows.

Clearing circuitry 34 is also shown in block diagram form and represents circuitry well-known to the prior art. It operates to clear operation register 19 of all information in response to a signal applied during the eighth phase of operation from sequence control 11. It operates so as to clear register 19, however, only when the information stored in the character count register 21 is zero. The signal applied to circuitry 34 from sequence control 11 is also indicated by an arrow with the letters SC adjacent the arrow.

Gate 35 also represents circuitry well-known in the prior art and it too is shown in block diagram form. In response to a signal applied thereto during the eighth phase of operation, it either returns sequence control 11 to the first phase of operation if character count register 21 contains zero or returns sequence control 11 to the sixth phase of operation if character count register 21 does not contain zero. The operation of gate 35 is also indicated by arrows drawn to and from this circuitry.

Memory 13 is also shown in block diagram form and may comprise any well-known circuitry capable of storing large quantities of binary information such as, for example, a matrix of magnetic cores. Combinational gating network and sequence control 11 is also shown in block diagram form with arrows emanating therefrom designated 1 through 8, representing signals applied by this circuitry during the eight phases of operation discussed previously. This circuitry decodes the operation code stored in operation register 19 and applies signals to the other elements of the command circuitry in accordance with the command to be carried out. Such circuitry is also well-known in the prior art.

Each of the elements shown herein in block diagram form is well-known in the prior art. Similar circuitry may be found, for example, in the copending application previously referred to or in the textbook previously referred to.

Additionally, operation register 19, sequence control 11 and gate 29 may be utilized to indicate which of several translation tables stored in memory 13 should be used. Gate 29 addresses a particular location in memory 13 in response to a signal from combinational gating network sequence control 11 and the information stored in register 28. The information stored in register 28 merely tells which address within a particular table is to be addressed while the signal from sequence control 11 may determine which of several tables is to be used.

Thus, in the operative description just concluded, the table depicted in FIG. 3 was utilized. In a similar manner the table depicted in FIG. 4 may be utilized. Thus, if the operand to be translated is again considered to be represented by the binary digits "100110" and the signal from sequence control 11, in response to the particular operation code stored in register 19 indicates that the table partially shown in FIG. 4 rather than the table of FIG. 3 is to be utilized, an address within memory 13 which contains the binary digits "001111" rather than the digits "110101" will be addressed and this translated information will be transferred to register 15 and subsequently stored in the proper address of memory 13.

What has been described is considered to be only one illustrative embodiment of the present invention. Accordingly, it is to be understood that various and numerous other arrangements may be devised by one skilled in the art without departing from the spirit and scope of this invention.

What is claimed is:

1. An apparatus for transferring and translating digital data in response to a single command comprising:

- a memory having a plurality of addresses for the storage of binary information therein,
- a first information character represented in accordance with a first code by a first plurality of binary digits stored in a first address of the memory,
- a second address of the memory being defined by the first plurality of binary digits,
- the first information character being represented in accordance with a second code by a second plurality of binary digits stored in the second address,
- means responsive to the single command for providing a particular combinatorial sequence of pulses,
- means responsive to the particular combinatorial sequence of pulses for reading the first plurality of binary digits out of the memory and for storing them in a first information register,
- means responsive to the particular combinatorial sequence of pulses utilizing the first plurality of binary digits for reading the second plurality of binary digits out of the memory and for storing them in a second information register, and
- means responsive to the particular combinatorial sequence of pulses for storing the second plurality of binary digits in a third predetermined address of the memory.

2. A digital data transfer and translate apparatus comprising:

- a memory having a plurality of addresses for the storage of binary information therein,
- a first plurality of binary digits representing a first transfer and translate command being stored in a first one of the addresses,
- means for reading the first plurality of digits out of the memory and for storing them in a first information register,
- means connected to the first information register for providing a first particular combinatorial sequence of pulses in accordance with the first particular plurality of binary digits,
- a first information character represented in accordance with a first code by a second plurality of binary digits stored in a second address of the memory,
- means for reading the second plurality of binary digits out of the memory and for storing them in a second information register,
- means utilizing the first particular combinatorial sequence of pulses and the second plurality of binary digits for addressing a particular third address of the memory,
- the first information character being represented in accordance with a second code by a third plurality of binary digits stored in the third address,
- means for reading the third plurality of digits out of the memory and for storing them in a third information register, and
- means for storing the third plurality of binary digits in a third address of the memory.

3. A digital data transfer and translate apparatus according to claim 2 in which:

a fourth plurality of binary digits representing a second transfer and translate command is stored in a fourth address of the memory, the first mentioned reading means reads the fourth plurality of digits out of the memory and stores them in the first information register, the means connected to the first information register provides a second particular combinatorial sequence of pulses in accordance with the fourth plurality of binary digits, the utilizing means utilizes the second particular combinatorial sequence of pulses and the second plurality of binary digits for addressing a particular fifth address of the memory, the first information character being represented in accordance with a third code by a fifth plurality of binary digits stored in the fifth address, the third mentioned reading means reads the fifth plurality of digits out of the memory and stores them in the third information register, and the storing means stores the fifth plurality of binary digits in a sixth address of the memory.

4. A digital data transfer and translate apparatus according to claim 2 in which:

a second information character is represented in accordance with the first code by a fourth plurality of binary digits stored in a fourth address of the memory, the utilizing means utilizes the first particular combinatorial sequence of pulses and the fourth plurality of binary digits for addressing a particular fifth address of the memory, the second information character being represented in accordance with the second code by a fifth plurality of binary digits stored in the fifth address, the third mentioned reading means reads the fifth plurality of digits out of the memory and stores them in a fifth information register, and the storing means stores the fifth plurality of binary digits in a sixth address of the memory.

5. A digital data transfer and translate apparatus comprising:

a memory having a plurality of addresses for the storage of binary information therein, a first plurality of binary digits representing a first transfer and translate command stored in a first one of the addresses, the command being divided into three sections, means for reading out of the memory a first portion of the first plurality of digits comprising the first section of the command and for storing these digits in a first information register, means for reading out of the memory a second portion of the first plurality of digits comprising the second section of the command and for storing these digits in a second information register, means for reading out of the memory a third portion of the first plurality of digits comprising the third section of the command and for storing these digits in a third information register, means connected to the first information register for providing a first particular combinatorial sequence of pulses in accordance with the first portion of the first plurality of digits, means utilizing the second portion of the first plurality of digits for reading out of the memory a second plurality of binary digits stored in a second address of the memory and for storing these digits in a fourth information register, the second address being defined by the second portion of the first plurality of digits, means utilizing the sequence of pulses and the second plurality of digits for reading out of the memory a third plurality of binary digits stored in a third address of the memory and for storing these digits in a fifth information register, the third address being defined by the pulses and the second plurality of digits, and means utilizing the third portion of the first plurality of digits for storing the third plurality of digits in a fourth address of the memory, the fourth address being defined by the third portion of the first plurality of digits.

6. A digital data transfer and translate apparatus comprising:

a memory having a plurality of addresses for the storage of binary information therein, a first plurality of binary digits stored in a first one of the addresses, means for reading out of the memory a first portion of the first plurality of digits and for storing these digits in a first information register, means for reading out of the memory a second portion of the fist plurality of digits and for storing these digits in a second information register, means utilizing the first portion of the first plurality of digits for reading out of the memory a second plurality of binary digits stored in a second address of the memory and for storing these digits in a third information register, the second address being defined by the first portion of digits, means utilizing the second plurality of digits for reading out of the memory a third plurality of binary digits stored in a third address of the memory and for storing these digits in a fourth information register, the third address being defined by the second plurality of digits, and means utilizing the second portion of the first plurality of digits for storing the third plurality of digits in a fourth address of the memory, the fourth address being defined by the second portion of the first plurality of digits.

7. A digital data transfer and translate apparatus according to claim 6 further comprising:

means for changing by a fixed binary digital amount the first portion of the first plurality of digits stored in the first information register, and means for changing by a fixed binary digital amount the second portion of the first plurality of digits stored in the second information register, the first mentioned utilizing means utilizing the changed first portion of the first plurality of digits for reading out of the memory a fourth plurality of binary digits stored in a fifth address of the memory and for storing these digits in the third information register, the fifth address being defined by the changed first portion of the first plurality of digits, the second mentioned utilizing means utilizing the fourth plurality of digits for reading out of the memory a fifth plurality of binary digits stored in a sixth address of the memory and for storing these digits in the fourth information register, the sixth address being defined by the fourth plurality of digits, and the third mentioned utilizing means utilizing the changed second portion of the first plurality of digits for storing the fifth plurality of digits in a seventh address of the memory, the seventh address being defined by the changed second portion of the first plurality of digits.

8. A digital data transfer and translate apparatus according to claim 7 in which the first and second portions of the first plurality of digits are both changed by the same binary digital amount.

9. A digital data transfer and translate apparatus comprising:

a memory having a plurality of addresses for the storage of binary information therein, a first plurality of binary digits representing a first command stored in a first one of the addresses, means for reading out of the memory a first part of the first plurality of digits, representing an operation code part of the command, and for storing these operation code digits in a first information register, means for reading out of the memory a second part of the first plurality of digits, representing an "address of operand" part of the command, and for storing these "address of operand" digits in a second information register, means for reading out of the memory a third part of the first plurality of digits, representing an "address of translated operand" part of the command, and for storing these "address of translated operand" digits in a third information register, means connected to the first information register for providing a first particular combinatorial sequence of pulses in accordance with the operation code digits, means utilizing the "address of operand" digits for reading out of the memory a second plurality of digits, representing an "operand" stored in a second address of the memory, and for storing these "operand" digits in a fourth information register, the second address being defined by the "address of operand" digits, means utilizing the first particular sequence of pulses and the "operand" digits for reading out of the memory a third plurality of binary digits, representing a "first translated operand" stored in a third address of the memory and for storing these "first translated operand" digits in a fifth information register, the third address being defined by the pulses and the "operand" digits, and means utilizing the "address of translated operand" digits for storing the "first translated operand" digits in a fourth address of the memory, the fourth address being defined by the "address of translated operand" digits.

10. A digital data transfer and translate apparatus according to claim 9 in which:

a fourth plurality of binary digits representing a second command is stored in a fifth address of the memory, the fourth plurality of binary digits contains an operation code part of the second command, an "address of operand" part of the second command identical to the "address of operand" part of the first command, and an "address of translated operand" part of the second command identical to the "address of translated operand" part of the first command, the first mentioned reading out means reads out of the memory the operation code digits of the second command and stores them in the first information register, the second mentioned reading out means reads out of the memory the "address of operand" digits of the second command and stores them in the second information register, the third mentioned reading out means reads out of the memory the "address of translated operand" digits of the second command and stores them in the third information register, the means connected to the first information register provides a second particular combinatorial sequence of pulses in accordance with the operation code digits of the second command, the first mentioned utilizing means utilizes the "address of operand" digits of the second command to read out of the memory again the "operand" digits and again stores them in the fourth information register, the second mentioned utilizing means utilizes the second particular sequence of pulses and the "operand" digits for reading out of the memory a fifth plurality of binary digits, representing a "second translated operand," stored in a sixth address of the memory and stores the "second translated operand" digits in the fifth information register, the sixth address being defined by the second sequence of pulses and the "operand" digits, and the third mentioned utilizing means utilizes the "address of translated operand" digits for storing the "second translated operand" digits in the fourth address of the memory.

11. A digital data transfer and translate apparatus comprising:

a memory having a plurality of addresses for the storage of binary information therein, a first plurality of binary digits representing a first command stored in a first one of the addresses, means for reading out of the memory a first part of the first plurality of digits, representing an operation code part of the command, and for storing these operation code digits in a first information register.

means for reading out of the memory a second part of the first plurality of digits, representing a "character count" part of the command, and for storing these "character count" digits in a second information register, means for reading out of the memory a third part of the first plurality of digits, representing a "first addres of operands" part of the command, and for storing these "first address of operands" digits in a third information register, means for reading out of the memory a fourth part of the first plurality of digits, representing a "first address of translated operands" part of the command, and for storing these "first address of translated operands" digits in a fourth information register, means connected to the first information register for providing a particular combinatorial sequence of pulses in accordance with the operation code digits, means utilizing the "first address of operands" digits for reading out of the memory a second plurality of digits, representing a "first operand," stored in a second address of the memory and for storing these "first operand" digits in a fifth information register, the second address being defined by the "first address of operands" digits, means utilizing the sequence of pulses and the "first operand" digits for reading out of the memory a third plurality of binary digits, representing a "first translated operand," stored in a third address of the memory and for storing these "first translated operand" digits in a sixth information register, the third address being defined by the pulses and the "first operand" digits, and means utilizing the "first address of translated operands" digits for storing the "first translated operand" digits in a fourth address of the memory, the fourth address being defined by the "first address of translated operands" digits.

12. A digital data transfer and translate apparatus according to claim 11, further comprising:

means for decreasing by a fixed binary digital amount the "character count" digits stored in the second information register, means for increasing by a fixed binary digital amount the digital information stored in the third information register, the resulting digits being "second address of operands" digits, and means for increasing by a fixed binary digital amount the digital information stored in the fourth information register, the resulting digits being "second address of translated operands" digits, the means connected to the first information register again providing the particular combinatorial sequence of pulses, the first mentioned utilizing means utilizing the "second address of operands" digits for reading out of the memory a fourth plurality of digits, representing a "second operand," stored in a fifth address of the memory and storing these "second operand" digits in the fifth information register, the fifth address being defined by the "second address of operands" digits, the second mentioned utilizing means utilizing the sequence of pulses and the "second operand" digits for reading out of the memory a fifth plurality of binary digits, representing "a second translated operand," stored in a sixth address of the memory and storing these "second translated operand" digits in the sixth information register, the sixth address being defined by the pulses and the "second operand" digits, and the third mentioned utilizing means utilizing the "second address of translated operands" digits for storing the "second translated operand" digits in a seventh address of the memory, the seventh address being defined by the "second address of translated operands" digits.

13 A digital data transfer and translate apparatus according to claim 12 further comprising:

means connected to the first information register and the second information register for clearing the first information register of all binary digits stored therein in response to the reduction of the binary digits stored in the second information register to a particular binary amount.

14. A digital data transfer and translate apparatus comprising:

a memory having a plurality of addresses for the storage of binary information therein, a first plurality of binary digits representing a first command stored in a first one of the addresses, the command including a plurality of parts, each part including at least one character, and each character including a particular number of binary digits, means for reading out of the memory a first part of the first plurality of digits comprising a single character, representing an operation code part of the command, and for storing these operation code digits in a first information register, means for reading out of the memory one character at a time of a second part of the first plurality of digits comprising several characters, representing an "address of operand" part of the command, and for storing these "address of operand" digits one character at a time in a second information register, means for reading out of the memory one character at a time of a third part of the first plurality of digits comprising several characters, representing an "address of translated operand" part of the command, and for storing these "address of translated operand" digits one character at a time in a third information register, means connected to the first information register for providing a particular combinatorial sequence of pulses in accordance with the operation code digits, means utilizing the "address of operand" digits for reading out of the memory a second plurality of digits comprising a single character, representing an "operand," stored in a second address of the memory and for storing these "operand" digits in a fourth information register, the second address being defined by the "address of operand" digits, means utilizing the sequence of pulses and the "operand" digits for reading out of the memory a third plurality of binary digits comprising a single character, representing a "translated operand," stored in a third address of the memory and for storing these "translated operand" digits in a fifth information register, the third address being defined by the pulses and the "operand" digits, and means utilizing the "address of translated operand" digits for storing the "translated operand" digits in a fourth address of the memory, the fourth address being defined by the "address of translated operand" digits.

References Cited

UNITED STATES PATENTS

| | | | |
|---|---|---|---|
| 3,092,823 | 6/1963 | Martin et al. | 340—347 |
| 3,199,085 | 8/1965 | Rhodes et al. | 340—172.5 |
| 3,226,649 | 12/1965 | King et al. | 340—172.5 |
| 3,229,078 | 1/1966 | Boland et al. | 235—154 |

OTHER REFERENCES

IBM System, 360 Principles of Operation, IBM Form A22–6821–1, File No. S 360–01, published June 1964 by IBM Corporation, Customer Manuals, Dept. B 98, P.O. Box 390 Poughkeepsie, N.Y. 12602.

ROBERT C. BAILEY, *Primary Examiner.*

I. S. KAVRUKOV, *Assistant Examiner.*